July 7, 1959     B. M. HELFAER ET AL     2,893,994
PROCESS FOR PRODUCING FINELY DIVIDED VAT DYE PIGMENTS
Filed July 30, 1956     4 Sheets-Sheet 1

FIG.I.
MAGNIFICATION
52,000x

*INVENTORS*
BERTRAM M. HELFAER
FREDERIC L. SIEVENPIPER
BY
ATTORNEY

MAGNIFICATION
38,200x

MAGNIFICATION
6,700x

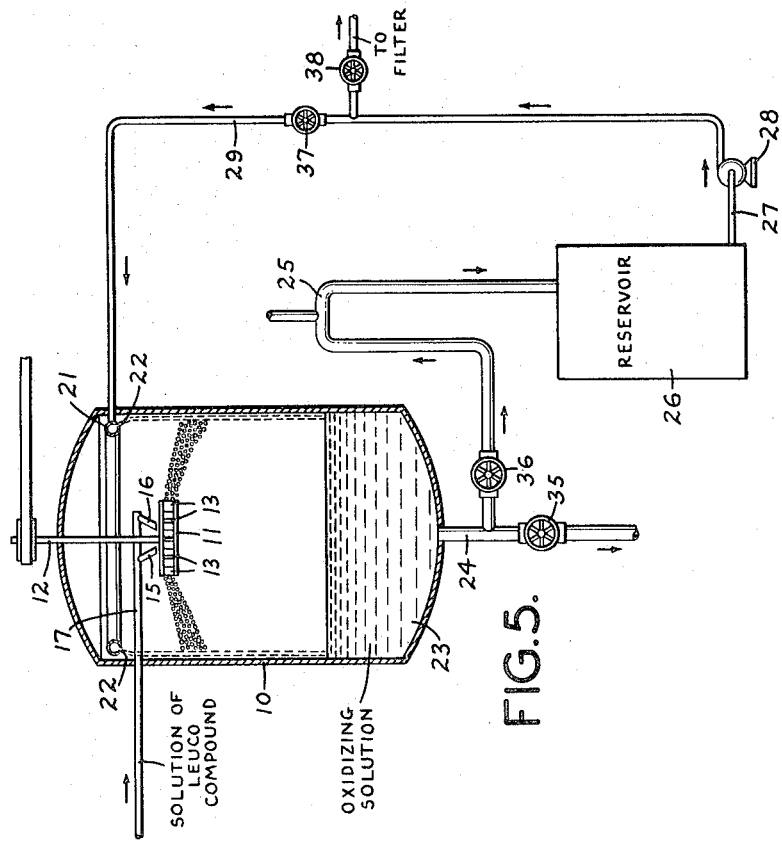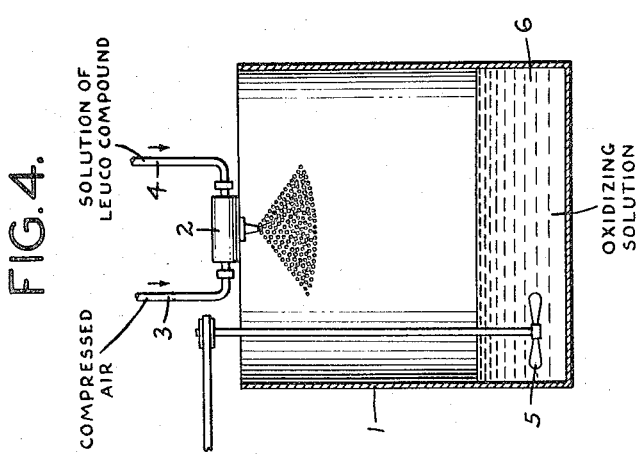

United States Patent Office 2,893,994
Patented July 7, 1959

2,893,994

PROCESS FOR PRODUCING FINELY DIVIDED
VAT DYE PIGMENTS

Bertram M. Helfaer, New York, and Frederic L. Sievenpiper, Alden, N.Y., assignors to Allied Chemical Corporation, New York, N.Y., a corporation of New York Application July 30, 1956, Serial No. 600,853

10 Claims. (Cl. 260—281)

This invention relates to vat dye pigments in finely divided form and to processes for producing them. It relates more particularly to a process for producing vat dye pigments which, by reason of their fineness of division and related properties, possess unusual properties as pigments.

An object of the present invention is to provide a novel process for producing vat dyes in extremely finely divided form eminently suitable for use as pigments.

A further object of the present invention is to provide improvements in processes for producing vat dyes in the form of finely divided pigments whereby pigments can be obtained in which the vat dye particles are substantially of uniform size and the greatest dimension of the particles does not exceed 0.5 micron.

Another object of the present invention is to provide improvements in processes for producing vat dyes in the form of finely divided pigments whereby pigments can be obtained having superior masstone and transparency, and cleaner shade (less greyness), as compared with pigments produced by known processes.

An additional object of the present invention is to provide a process whereby vat dyes which are readily sulfonated by strong sulfuric acid or which form difficultly soluble oxonium sulfates can be readily converted into finely divided pigment form.

Other objects of the invention will in part be obvious and will in part appear hereinafter.

Vat dyes are chemical compounds having a number of chemical and physical properties which make them valuble pigments for coloring various material. Thus, because of their fastness properties and high coloring power, they are used for coloring plastics, lacquers, paper, as well as in printing and dyeing of textile fibers and fabrics. Thus they are used as pigments in automobile lacquers because of their variety of color and good fastness properties. By reason of their resistance to alkali and soap, they are used for coloring paper, especially paper used as soap wrappers. By reason of their fastness properties, they are used as pigments in the pigment-printing of textiles (pigmented resin processes) and in the spin-dyeing (dope-dyeing and melt-dyeing) of artificial fibers and fabrics such as nylon, cellulose acetate, rayon, etc.

For brilliance of shade and economy (color value), it is essential that the pigment be of fine particle size. For the spin-dyeing of synthetic fibers, 99.5% of the pigment particles must be less than 1 micron in greatest dimension.

Pigments are usually evaluated in terms of their pigment effect produced when ground in varnish oil. Thus, a procedure commonly used for evaluating pigments is by means of oil drawdowns of a paste of the pigment in lithographer's varnish oil. When the vat dye is in the form of a filter cake or vat dye paste, the oil drawdowns are prepared as follows:

An amount of filter cake or vat dye paste equivalent to 2 grams of color solids is kneaded with 8 grams of lithographer's varnish oil, 00 grade, until the pigment is flushed into the oil, after which the water is removed by decantation. The thick oil-pigment paste thus obtained is further worked on a Hoover muller. Drawdowns are made on paper with a resulting oil-pigment paste by the usual techniques for evaluation of masstone, shade and transparency of pigments. For comparisson of shade and strength when diluted with pigment extenders, 200 mgs. of the oil-pigment paste (equivalent to 40 mgs. of color solids) are mulled with 6 grams of zinc oxide extender, and drawdowns are made with the resulting product.

Vat dyes as obtained commercially in the manufacture thereof are unsatisfactory for use as pigments because of their particle structure. The particles are of excessive size, are non-uniform, and contain masses of aggregated particles which cannot be disintegrated satisfactorily, either by grinding and milling, or by treatment of a filter cake or aqueous paste of the vat dye with dispersing agents, such as formaldehyde condensation products of naphthalene sulfonates (e.g., Tamol N).

It is known to prepare vat dyes in finely divided form by various so-called "acid-pasting" procedures, wherein the vat dye is reprecipitated from a solution in sulfuric acid by diluting the sulfuric acid solution with a large amount of water (so-called "drowning"). Various modifications of the latter procedure have been proposed; such as introduction of the sulfuric acid solution of the vat dye into a stream of water which is in a state of turbulent flow, or spraying of the sulfuric acid solution of the vat dye into a pool or spray of water.

The acid-pasting procedure is unsatisfactory for a number of reasons. Thus, the pigment is obtained in the form of non-uniform crystals of the vat dye, since the diluting action is not uniform throughout the sulfuric acid solution and local temperature effects due to the heat of dilution of the sulfuric acid cause uneven crystallization. Fig. 2 of the drawings shows the uneven crystal structure and large particle size of a vat dye obtained by the acid-pasting procedure. Furthermore, many anthraquinone and thioninidigoid vat dyes form difficultly soluble or insoluble oxonium sulfates when treated with sulfuric acid of sufficient strength to dissolve them, which oxonium sulfates separate from the sulfuric acid solutions in the form of large crystals or crystal masses. And some vat dyes, such as indigo, are readily sulfonated by strong sulfuric acid or form insoluble sulfates with less strong sulfuric acid.

It is also known to obtain organic vat dyes in the pigment form by oxidizing a water-soluble leuco compound of the vat dye to the insoluble pigment form. Thus it is known to precipitate the vat dye in the insoluble pigment form from an aqueous solution of a leuco compound of the vat dye in the form of its water-soluble salt, by treating the solution with an oxidizing agent. Aqueous solutions of the leuco compounds of the vat dyes are obtained by dissolving a vat dye of the anthraquinone, indigoid, sulfur or other type, in an aqueous alkaline solution (e.g. in aqueous caustic alkali) with the aid of a suitable reducing agent, thereby converting the vat dye to a salt of its leuco compound. Sodium and potassium hydroxides are generally employed as alkalis, and various substances are employed as reducing agents; such as alkali metal and ammonium hydrosulfites, formaldehyde sulfoxylates, reducing sugars (e.g., glucose), and the like. In view of their availability and lower cost, sodium hydroxide and sodium hydrosulfite are ordinarily employed.

Various oxidizing agents are employed to reconvert the salt of the leuco compound to the insoluble vat dye (oxidized) form. Thus it is known to aerate the solution of the leuco compound by passing air through the solution, or by beating air into it. It is also known to treat the aqueous solution of the leuco compound with an oxidizing agent in which oxygen is linked to a different atom, such as an alkaline hypochlorite, hydrogen peroxide, other peroxides, organic nitro compounds (e.g. meta-nitro-benzenesulfonic acid and salts thereof), potassium permanganate, etc.

Vat dye pigments obtained by this procedure are generally in the form of heterogeneous masses of crystalline particles which are non-uniform in size and which are of the order of 5 microns in their greatest dimension. They have the disadvantages that, when employed as pigments, they have inadequate masstone, are deficient in transparency, and their shades tend to be grey rather than having the desired brilliancy. They cannot be used for spin-dyeing of synthetic fibers because of their excessive particle size.

According to the present invention, vat dye pigments are produced in extremely finely divided form by dispersing an aqueous alkaline solution of a leuco compound of a vat dye into fine droplets, and oxidizing the leuco compound to the vat dye and precipitating the resulting vat dye in finely divided form by contacting the droplets of solution while in the dispersed form, with a liquid oxidizing medium, preferably an aqueous medium containing an oxidizing agent in which oxygen is linked to a different atom, and recovering the resulting precipitate.

We have discovered that finely divided vat dye pigments can be thus obtained in the form of a substantially homogeneous mass of non-crystalline or micro-crystalline particles which are substantially uniform in size and which do not exceed 1 micron in greatest dimension. Our process makes possible the production of such pigments which are mainly not more than 0.5 micron and even about 0.3 micron or less in their greatest dimension. In addition, the resulting vat dye pigments are distinguished by greater strength (superior color value), deeper masstone and clarity of shade as compared with vat dye pigments obtained in the absence of the treatment of the present invention.

Masstone and transparency are pigment properties which are affected by the temperature of the oxidizing medium, and pigment shades may be varied widely by variation of the temperature, as is known. Nuances of pigment shade are also influenced by particle size of the pigment. We have found that the process of the present invention permits a superior control of the temperature of the precipitating medium in which the pigment is formed, and thereby provides valuable and unexpected improvements in reproducibility and control of pigment particle size and pigmentary properties generally.

Thus, by controlling the temperature of the oxidizing and precipitating medium, while maintaining constant other variables affecting pigment properties, it is possible, by means of our process, to produce a preferred pigment shade and then standardize production to this shade. In the acid-pasting process, temperature control at the point of pigment particle formation (and hence control and reproducibility of results) is difficult and obscured by the heat generated by contact of concentrated sulfuric acid solutions with water.

It is a feature of the present invention that it makes possible, and is particularly valuable for, the production of finely divided pigments of vat dyes which are readily sulfonated by strong sulfuric acid or which form difficultly soluble sulfates with sulfuric acid of sufficient strength to dissolve them, such as, indigo; N,N'-bis(aryl)-3,4,9,10-perylenetetracarboxylic diimides (e.g., wherein aryl is phenyl, tolyl, chloro-methyl-phenyl, methoxy-phenyl, etc.); dialkoxy-dibenzanthrones, such as Carbanthrene Brilliant Green (dimethoxy-dibenzanthrone—C.I. 1101); and Carbanthrene Blue Green FFB ($\Delta^{2,2'}$-bianthra [2,1,9-cde] thianaphthene-5-one—cf. U.S.P. 1,859,151—C.I. 1173). Such vat dye pigments in the finely divided form produced by the process of the present invention, are novel and constitute a part of the present invention.

Our process can be carried out with any vat dye capable of yielding a leuco compound soluble in water. Such vat dyes and process for converting them into water-soluble leuco compounds are well known and form no part of our invention.

In general, pigment particle size decreases with decrease in the droplet size as well as decrease in the concentration of the leuco compound in the solution composing the droplet. For optimum results the solution of leuco compound of vat dye to be dispersed according to our invention should contain the leuco compound in complete solution. There is no lower limit for concentration of leuco compound other than that imposed by economic and practical considerations. Undissolved or precipitated particles of leuco compound or vat dye per se are not converted to an improved pigment form according to our invention, and their presence in substantial amounts in the atomized solution is preferably avoided. If the solution contains such particles or insoluble impurities in a substantial amount, it is preferably filtered prior to being subjected to the process of this invention.

In the accompanying drawings, which constitute a part of the present application, Figs. 1, 2 and 3 are reproductions of electronmicrographs of the vat dye Carbanthrene Yellow G (Color Index No. 1118) in the form of pigments produced in various ways, and Figs. 4 and 5 are illustrative of apparatus useful in carrying out the process of the present invention.

Figure 1:
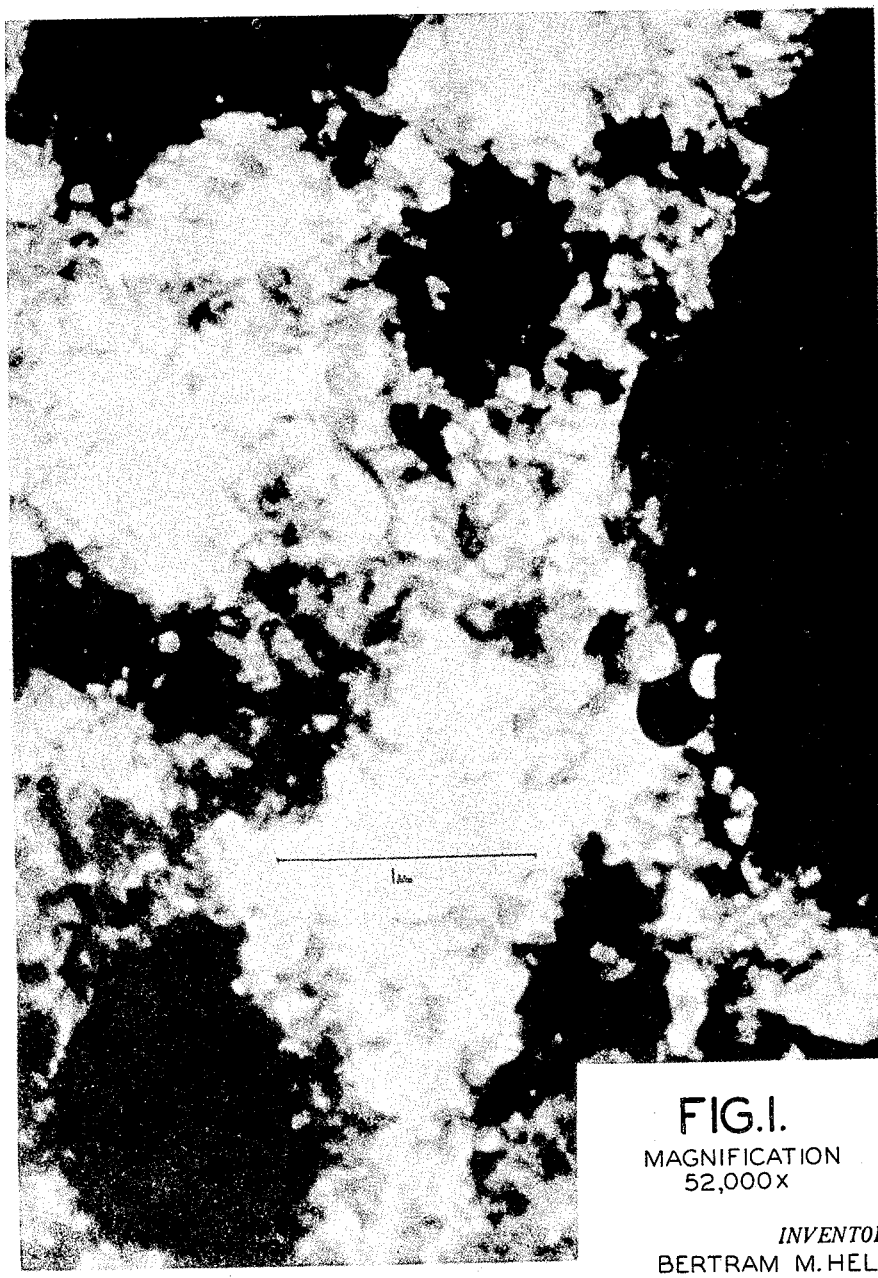
Fig. 1 is a reproduction of an electronmicrograph of the pigment as obtained in accordance with the present invention, photographed at a magnification of 52,000 diameters.

The leuco solution of the vat dye may be converted to the spray form by any method which will produce a suitably dispersed, discontinuous phase of the solution. In general, the spray should not contain a substantial proportion of droplets greater than 30 microns in diameter and preferably should not contain a substantial proportion of droplets exceeding 15 microns in diameter. For the production of especially preferred pigments, the majority of the droplets in the spray should be in the 3 to 5 micron range. Various atomizing devices, including a centrifugal spray (a rotating disc), an air gun such as is employed in spraying paint, and a pneumatic spray nozzle, have been successfully employed.

In some cases, for example, when employing a rotating disc spray device, it may be desirable to add a small amount (e.g. a few percent) of a surface-tension depressant to the solution of leuco compound to assist in the formation of fine droplets of dispersed solution. While various types of surface-tension depressants compatible with the alkaline solutions of the leuco compounds may be employed, such as higher alkylaryl sulfonates and polyoxyalkylene ethers of alcohols (including polyhydric alcohols) and phenols, those which are non-foaming are preferred.

Ordinarily, the particles of solution of leuco compound traverse an air space before striking the oxidizing medium, during which partial oxidation of the leuco compound by air may take place. However, it is within the scope of the invention to spray the solution of leuco compound into an inert atmosphere with total oxidation occurring in the liquid oxidizing phase.

The dispersed droplets of solution of leuco compound may be brought into contact with the liquid oxidizing medium in various ways. Thus they can be permitted to fall into an agitated body of the liquid oxidizing medium while still in the dispersed form. The rate at which the leuco solution is introduced into the oxidizing medium is immaterial if the rate of mixing or stirring of the reducing medium is sufficient to prevent accumulation of unoxidized leuco compound at the interface, or the dispersed droplets of solution of leuco compound can be brought into contact with a film or curtain of liquid oxidizing medium surrounding the space into which the droplets of solution are projected so as to intercept the droplets while they are in dispersed form.

Any suitable oxidizing agent containing oxygen linked to a different atom and adapted to oxidize the leuco compound to the insoluble vat form can be employed, a number of which are known; as for example, alkali metal hypochlorites, hydrogen peroxide and other peroxides, permanganates, organic nitro compounds and the like. Preferably, the oxidizing agent is employed in the form of an aqueous solution, so as to facilitate recovery of the oxidized pigment by a simple filtration operation. The concentration and oxidizing potency are at least sufficient to complete the oxidation of the leuco compound to the vat dye. The chemical nature of the oxidizing agent employed and its concentration and oxidizing potency are preferably selected in relation to the pigment characteristics and chemical nature of the particular dye molecule undergoing treatment, since, as is known, the shade characteristics of the pigment may be varied by choice and concentration of the oxidizing agent. Preferably an oxidizing agent is selected which is known to be compatible with the particular dye molecule undergoing treatment. For example, in the case of indigo, sodium hypochlorite is not preferred as oxidizing agent, inasmuch as the dye is partially destroyed by it at temperatures above ordinary room temperature.

The temperature of the oxidizing medium may vary over a wide range. Preferably temperatures within the range about 20° C. to about 90° C. are employed, although lower temperatures, e.g., 0° C., and higher temperatures, e.g., about 100° C., may be employed if desired. The particular temperature employed in a particular case will depend upon the specific shade and related characteristics of the pigment desired, since, as pointed out above, said pigment characteristics can be varied by varying the temperature.

The finely divided vat dye pigments resulting from the treatment of the present invention can be recovered in any desired form. Thus, they can be separated in the form of filter cakes by filtration of the mixture resulting from the oxidation reaction, or in any other suitable manner. They may be employed as such or subjected to further treatment for use as pigments, such as, conversion to pastes, evaporation, flushing into oil vehicles, drying, laking, etc. If the filter cake contains aggregates of the vat dye particles, they can be readily disintegrated by stirring in an aqueous medium with the addition of a small amount of one of the usual dispersing agents commonly employed for dispersing vat dyes, such as formaldehyde condensation products of alkyl naphthalene sulfonic acids (e.g. Tamol N) and so-called "lignosulfonates."

In order that the invention may be understood more fully, reference should be had to the following description and Figures 4 and 5 of the accompanying drawings showing, somewhat schematically, two forms of apparatus suitable for carrying out the invention.

As shown in Figure 4, the apparatus comprises a vessel 1 in which is mounted, near the top thereof, an atomizer 2 of the pneumatic aspirator type to which is connected a source of compressed air by pipe 3 and a source of solution of leuco compound by pipe 4. An agitator 5 is mounted in the vessel 1 to stir the liquid oxidizing medium 6 contained in the vessel. The dimensions of the vessel 1 are so chosen in relation to the specific atomizer 2 employed that the spray of solution emerging from the atomizer nozzle falls into the oxidizing bath 6 while in the dispersed form (without contacting the inner walls of vessel 1).

The apparatus illustrated in Figure 5 of the drawings comprises a cylindrical vessel 10 within the upper portion of which is mounted a rotating spray disc 11 upon an axially mounted rotating shaft 12. As shown, the disc includes vanes 13 for facilitating the dispersion of the leuco solution. Feed nozzles 15 and 16 for feeding the solution of leuco compound to the rotating disc 11 are mounted on pipe 17 which is connected with a source of solution of leuco compound. A spray ring 21 is mounted above the rotating disc 11 within the upper portion of the vessel 10. The spray ring 21 is provided with openings 22 around the lower circumference thereof and is of such dimensions as to provide a continuous film of oxidizing solution upon the inner wall of the vessel 10. The bottom 23 of the vessel 10 is connected with an outlet 24 which, in turn, is connected through an inverted U-tube 25 with a reservoir 26 which, in turn, is connected through pipe 27 with a circulating pump 28. The outlet from pump 28 is connected through a return line 29 with the ring 21. The return line 29 is also connected with an offtake 30 which leads to a suitable filter, not shown. Suitable valves, such as valves 35, 36, 37 and 38, are provided for control of the flow of liquids. Suitable temperature regulating means (not shown) are also provided.

In carrying out the process of the present invention in connection with the apparatus shown in Fig. 4, the vessel 1 is charged with oxidizing solution 6 and, while the agitator 5 is gently operated, compressed air is introduced to the nozzle through pipe 3, thereby aspirating from the nozzle the solution of leuco compound of the vat dye introduced through pipe 4 and dispersing said solution into fine droplets through the action of the nozzle. Any suitable nozzle adapted to provide the fine subdivision of the solution of leuco compound referred to above may be employed.

In carrying out the process in connection with the apparatus shown in Fig. 5, oxidizing solution is charged to the vessel 10 and a portion of it is permitted to overflow into reservoir 26 from which it is pumped by pump 28 through the return line 29 (valve 37 being open and valve 38 being closed) to ring 21, from which it falls in the form of a continuous film down the inner wall to the bottom 23 of the vessel 10. When an adequate supply of oxidizing solution at the desired temperature is falling through the vessel 10 in the form of said film, the disc 11 is rotated at high speed and the solution of leuco compound is introduced through pipe 17 and nozzles 15 and 16 onto the rotating disc 11, whereby it is dispersed by centrifugal action into droplets of extremely small size and brought into contact, while in such dispersed form, with the film of oxidizing solution falling from ring 21. When the conversion of the solution of leuco compound to oxidized vat dye has been carried out to the desired extent, valve 37 is closed, valve 38 is opened, and the resulting suspension of vat dye in the oxidizing solution is pumped to the filter by pump 28.

The size and type of rotating disc employed and the speed of rotation are chosen so as to provide a dispersion of the leuco solution of the type referred to above. Various rotating discs are known for the production of dispersions of liquids of the type required in accordance with the present invention. The dimensions of vessel 10 and size of openings in the ring 21 are so selected that a film of the oxidizing solution of sufficient volume falls from the ring 21 to intercept and carry downward the particles of solution of leuco compound dispersed by the rotating disc 11 while in dispersed form. Preferably the volume of liquid forming the film falling from ring 21 is sufficient to prevent the spray of solution of leuco compound from penetrating to the inner wall of the vessel 10. If desired, however, the oxidizing solution may be allowed to fall as a cylindrical curtain, which is adjacent to but spaced from the inner wall of the vessel 10 and which intercepts the spray of leuco solution.

The invention will be illustrated by the following specific examples, but it is to be understood that the invention is not limited to their details and that changes may be made without departing from its scope. The temperatures are in degrees centigrade, and the parts and percentages are by weight unless designated as parts by volume. Where parts are by volume, the amount signifies the volume occupied by the same number of parts by weight of water at 4° C.

*Example 1*

A solution of the leuco compound of the vat dye N,N' - bis(p - methoxyphenyl) - 3,4,9,10 - perylenetetracarboxylic diimide was prepared by diluting 102.5 parts of a paste of said dye (Carbanthrene Scarlet R), containing 20 parts of dye solids, with water to 2,000 parts by volume, and adding 15 parts of a 50 percent aqueous caustic soda solution and 20 parts of sodium hydrosulfite, at 50°. The resulting solution of the leuco compound of the vat dye was atomized through an air actuated spray nozzle in an apparatus of the type shown in Fig. 4 of the drawings. Employing an apparatus of the type shown in Fig. 4, wherein the spray nozzle was a type J nozzle provided with a No. 60150 liquid nozzle and a No. 180 air nozzle, manufactured by the Spraying Systems Co., Chicago, Ill., located 9 to 11 inches above the surface of the aqueous hypochlorite solution, the solution of leuco compound was atomized at the rate of 8 liters per hour with an air pressure of 30 pounds per sq. in. The resulting spray was allowed to strike upon a slowly agitated aqueous sodium hypochlorite solution which was at a temperature of 50° and which contained 1500 parts by volume of 10% aqueous sodium hypochlorite solution in 6000 parts of water, whereby the leuco compound was reoxidized to the vat dye. The resulting precipitate was filtered off and washed with water.

The resulting pigment when examined in an electron microscope, showed a primary particle size of less than 0.1 micron, and was distinguished by the homogeneity and substantial uniformity of the pigment particles. In varnish oil drawdowns prepared as described above, the pigment possessed deeper masstones, superior transparency and cleaner shades than a corresponding pigment prepared in the same manner but without the atomizing process of the present invention (that is, by mixing the solution of the leuco compound employed in this example with the oxidizing solution employed in this example, while agitating vigorously). When diluted with zinc oxide extender, the pigment possessed about 30% stronger color value than the corresponding pigment produced without the atomizing process of the present invention.

*Example 2*

Part 1.—A solution of the leuco compound of the vat dye Carbanthrene Yellow G (Color Index 1118) was prepared in the manner described above in Example 1, and the solution was further treated as described in Example 1.

The resulting pigment, when examined in an electron microscope, produced the electronmicrograph which is reproduced in Fig. 1 of the accompanying drawings. As shown by the electronmicrograph, the pigment was in such extremely finely subdivided form that even at a magnification of 52,000 diameters the product appears as an amorphous powder, the individual particles of which cannot be discerned. As in the case of the product of Example 1, in varnish oil drawdowns the pigment showed deep masstones, a high degree of transparency and brilliance and cleanness of shade (lack of greyness).

Part 2.—The vat dye employed in Part 1 of this example was subjected to the usual acid-pasting procedure employing sulfuric acid as the solvent medium.

Figure 2:
Fig. 2 is a reproduction of an electronmicrograph of the pigment as obtained by the usual acid-pasting procedure, photographed at a magnification of 38,200 diameters.

The resulting pigment, when examined in an electron microscope, produced the electronmicrograph which is reproduced in Fig. 2 of the accompanying drawings. As shown by the electronmicrograph, the pigment was in the form of non-uniform crystals and crystal masses, many of which were considerably larger than 1 micron in size, and most of which were larger than 0.5 micron.

Part 3.—The process of Part 1 of this example was repeated, but without the oxidizing solution. The solution of the leuco compound of the vat dye was atomized and the resulting spray was allowed to become oxidized by the action of the air in vessel 1.

Figure 3:
Fig. 3 is a reproduction of an electronmicrograph of the pigment as obtained by a spraying procedure not embodying our invention, photographed at a magnification of 6,700 diameters.

The pigment thus obtained had inferior masstone, transparency and cleanness of shade as compared with the pigment obtained in accordance with Part 1 of this example. When examined in an electron microscope, it produced the electronmicrograph which is reproduced in Fig. 3 of the accompanying drawings. As shown by the electronmicrograph, the pigment is in the form of large aggregates of non-uniform crystals of the vat dye, many of which crystals are considerably larger than 1 micron in size.

*Examples 3 to 10*

Each of the following vatd yes was converted into a pigment in essentially the manner described in Example 1:

| Example No. | Vat Dye |
|---|---|
| 3 | Monochloro-N,N'-bis(p-tolyl)-3,4,9,10-perylene-tetracarboxylic diimide. |
| 4 | Carbanthrene Brilliant Green (Color Index 1101). |
| 5 | Carbanthrene Red BN (Color Index 1162). |
| 6 | Carbanthrene Blue Green FFB (Color Index 1173). |
| 7 | Dibromoanthranthrone. |
| 8 | N,N'-Diethyl-2,2'-dipyrazolanthronyl. |
| 9 | 2(1-Amino-2-anthraquinonyl)-anthra(2,3)-oxazole-9,10-dione. |
| 10 | 1,2,5,6-Anthraquinone-C-diphenyldithiazole. |

The resulting pigment products possessed superior fineness of particle size and superior pigment properties as compared with the corresponding pigments produced without the atomizing process of the present invention (that is, by mixing the solution of the leuco compound with the oxidizing solution while agitating vigorously).

*Example 11*

A sample of press cake containing 25 parts of Carbanthrene Blue RS (Color Index 1106) was diluted to 1000 parts by volume with water and reduced by the addition of 50 parts of flake caustic potash and 25 parts of sodium hydrosulfite at 50°. The leuco solution was then diluted to 4,000 parts by volume and further treated in the manner disclosed in Example 1 (using an apparatus of the type shown in Fig. 4). The oxidizing bath consisted of a solution of 25 parts of meta-nitrobenzene sodium sulfonate in 1,000 parts of water at 60°.

The precipitated color was filtered off and washed with water. By visual microscopy, the product consisted of translucent agglomerates in the form of dust-like flocs with no visible crystalline form. In varnish drawdowns prepared as described above, the pigment product was superior in masstone, clarity and strength of shade to a corresponding pigment prepared in essentially the same manner but without the atomizing process of the present invention.

*Example 12*

100 parts of indigo, in the form of an aqueous filter cake obtained in commercial manufacture thereof by oxidation of indoxyl solution, were slurried in 6,000 parts of water and reduced to the leuco form with 230 parts of 50% aqueous sodium hydroxide solution and 100 parts of sodium hydrosulfite at 45°. The leuco solution was filtered to remove a small amount of insoluble matter and was further treated as described in Example 1. The oxidizing bath consisted of a solution of 125 parts of sodium m-nitrobenzene sulfonate in 6,000 parts of water at 60°. When all of the leuco-indigo solution had been atomized, the resulting aqueous mixture was stirred for an additional half hour and filtered. The filter cake was washed with water until alkali-free.

An electron micrograph showed that the product consisted of unaggregated, substantially uniform micro-crystalline particles of about 0.5 micron in size. In contrast thereto, the indigo press-cake employed as starting material consisted essentially of amorphous aggregates of up to 20 microns in size which could not be disintegrated to the desired particle size by known milling techniques. Samples of the indigo pigment obtained in the process of this example, and of the indigo starting material were ground in varnish oil with and without zinc oxide extender, and drawdowns made as described above. Compared with the indigo starting material, the pigment obtained by the process of this example possessed darker masstone and greater transparency in varnish oil, and with zinc oxide extender yielded cleaner (less grey) blue shades of about double the tinctorial strength.

Example 13

76 parts of filter cake of the vat dye Carbanthrene Red Bn (C.I. 1162) containing 30 parts of color solids were diluted to 1500 parts by volume with water. The slurry was heated to 50° and 45 parts of 50% aqueous sodium hydroxide solution, 30 parts of powdered sodium hydrosulfite and 2 parts of "Tween 20" (polyoxyalkylene ether of sorbitan monolaurate, a non-ionic surface-active agent) were added. The mixture thus obtained was agitated at 50° for about 10 minutes to insure completion of the vatting step, and then was dispersed by means of a modified apparatus of the type shown in Fig. 5, in which a film of the circulating oxidizing solution was passed downward over the inner wall of the vessel 10, which had an inside diameter of about 10 inches. The disc was 2 inches in diameter and was rotated at 14,000 r.p.m. The solution was fed to the disc at the rate of about 3 liters per hour. The resulting spray was brought into contact with the oxidizing solution, which was obtained by dissolving 200 parts by volume of aqueous sodium hypochlorite (containing 10% available chlorine) in 2,000 parts of water at room temperature. The oxidizing sloution was circulated at room temperature and at a rate sufficient to provide a continuous film flowing down the inner wall of the vessel 10. The precipitated vat dye was filtered off and washed with water.

The resulting pigment had superior fineness of particle size, uniformity, and superior pigment properties, similarly to the product of Example 5.

Example 14

186 lbs. indigo paste containing 38 lbs. of color solids, as obtained commercially, was converted to an aqueous solution of its leuco compound by slurrying it with 2080 lbs. of water and 51 lbs. of 50% aqueous sodium hydroxide solution, heating the slurry to 50–55°, adding 40 lbs. of powdered sodium hydrosulfite, and stirring the resulting mixture for about 10 minutes at 50–55° to complete the conversion to the leuco compound. The solution thus obtained was further treated in the manner described above, employing an apparatus of the type shown in Fig. 5 of the drawings in which the vessel 10 had an inside diameter of 4 feet and a height of 4½ feet and the dispersing means was a Bowen disc, 8 inches in diameter, rotated at 6,500 r.p.m. The leuco solution was fed onto the disc at the rate of 30 lbs. per minute. The oxidizing solution was prepared by dissolving 40 lbs. of sodium meta-nitrobenzene sulfonate in 2320 lbs. of water, and was circulated at a temperature of 60°. When all of the leuco solution had been dispersed and oxidized, the resulting suspension of indigo was filtered off and washed with water until alkali-free.

The resulting pigment had the superior properties of the product of Example 12.

We claim:

1. The improvement in the process of producing a vat dye pigment by reacting a leuco compound of a vat dye with an oxidizing agent which comprises dispersing an aqueous alkaline solution of a leuco compound of a vat dye into fine droplets, and oxidizing the leuco compound to the vat dye and precipitating the resulting vat dye in finely divided form by contacting the droplets of solution, while in dispersed form, with a liquid oxidizing medium.

2. The improvement in the process of producing a vat dye pigment by reacting a leuco compound of a vat dye with an oxidizing agent which comprises dispersing an aqueous alkaline solution of a leuco compound of a vat dye into a spray of droplets not exceeding 30 microns in diameter and oxidizing the leuco compound to the vat dye and precipitating the resulting vat dye in finely divided form by contacting the droplets of solution, while in dispersed form, with an aqueous oxidizing medium containing an oxidizing agent in which oxygen is linked to a different atom.

3. A process for producing a vat dye pigment in finely divided form as defined in claim 2, wherein the droplets of solution are contacted with an aqueous solution of the oxidizing agent which is at a temperature of about 20° C. to about 90° C.

4. A process for producing a vat dye pigment in finely divided form as defined in claim 2, wherein the aqueous alkaline solution of leuco compound is dispersed into a spray of droplets not exceeding 15 microns in diameter, and the droplets of solution are contacted with an aqueous oxidizing medium which is at a temperature of about 20° C. to about 90° C.

5. A process for producing a vat dye pigment in finely divided form as defined in claim 4, wherein the majority of the dispersed droplets of solution are 3 to 5 microns in diameter.

6. The improvement in the process of producing a vat dye pigment by reacting a leuco compound of a vat dye with an oxidizing agent which comprises dispersing an aqueous alkaline solution of a leuco compound of a vat dye into a spray the droplets of which do not exceed 30 microns in diameter and the majority of which are 3 to 5 microns in diameter, and oxidizing the leuco compound to the vat dye and precipitating the resulting vat dye in finely divided form by contacting the droplets of solution, while in dispersed form, with an aqueous solution of an oxidizing agent containing oxygen linked to a different atom which is at a temperature of about 20° C. to about 90° C.

7. A process for producing a vat dye pigment in finely divided form as defined in claim 6, wherein the vat dye is indigo.

8. A process for producing a vat dye pigment in finely divided form as defined in claim 6, wherein the vat dye is N,N'-bis(aryl)-3,4,9,10-perylenetetracarboxylic diimide.

9. A process for producing a vat dye pigment in finely divided form as defined in claim 6, wherein the vat dye is a dialkoxy-dibenzanthrone.

10. A process for producing a vat dye pigment in finely divided form as defined in claim 6, wherein the vat dye is $\Delta^{2,2'}$-bianthra[2,1,9-cde]thianaphthene-5-one.

References Cited in the file of this patent

UNITED STATES PATENTS

| | | |
|---|---|---|
| 2,020,387 | Waldron | Nov. 12, 1935 |
| 2,507,944 | Taras | May 16, 1950 |